Aug. 14, 1956  F. E. VAN DUSEN  2,758,729
VEHICLE MOUNTED BALE LOADER
Filed Oct. 5, 1953  4 Sheets-Sheet 1
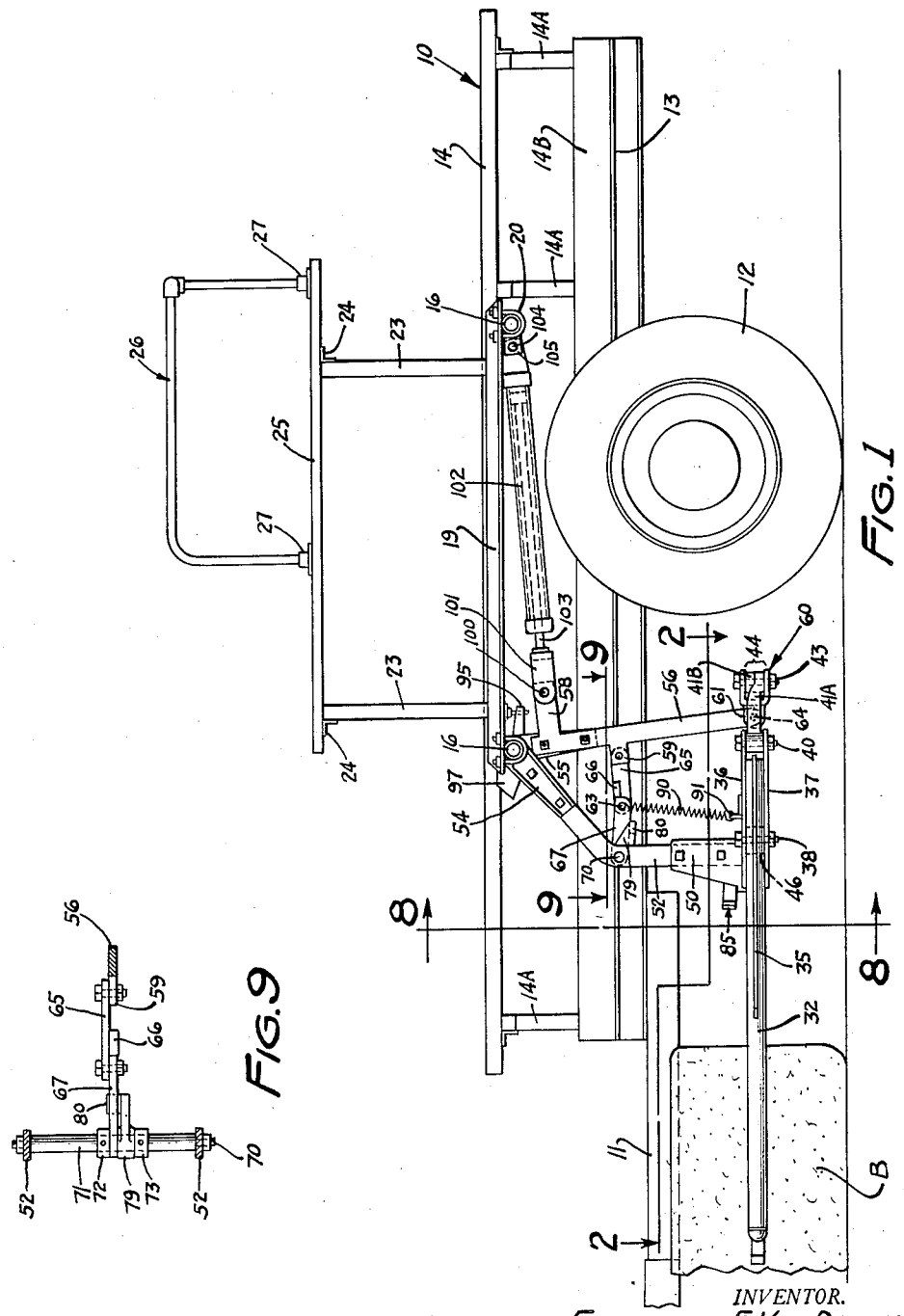
INVENTOR.
FREDERICK E. VAN DUSEN
BY
Paul, Moore & Dugger
ATTORNEYS

INVENTOR.
FREDERICK E. VAN DUSEN
BY
ATTORNEYS

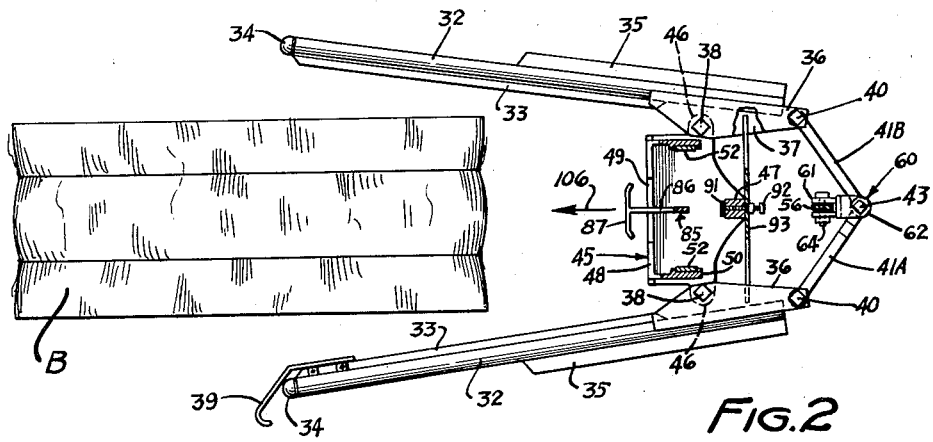
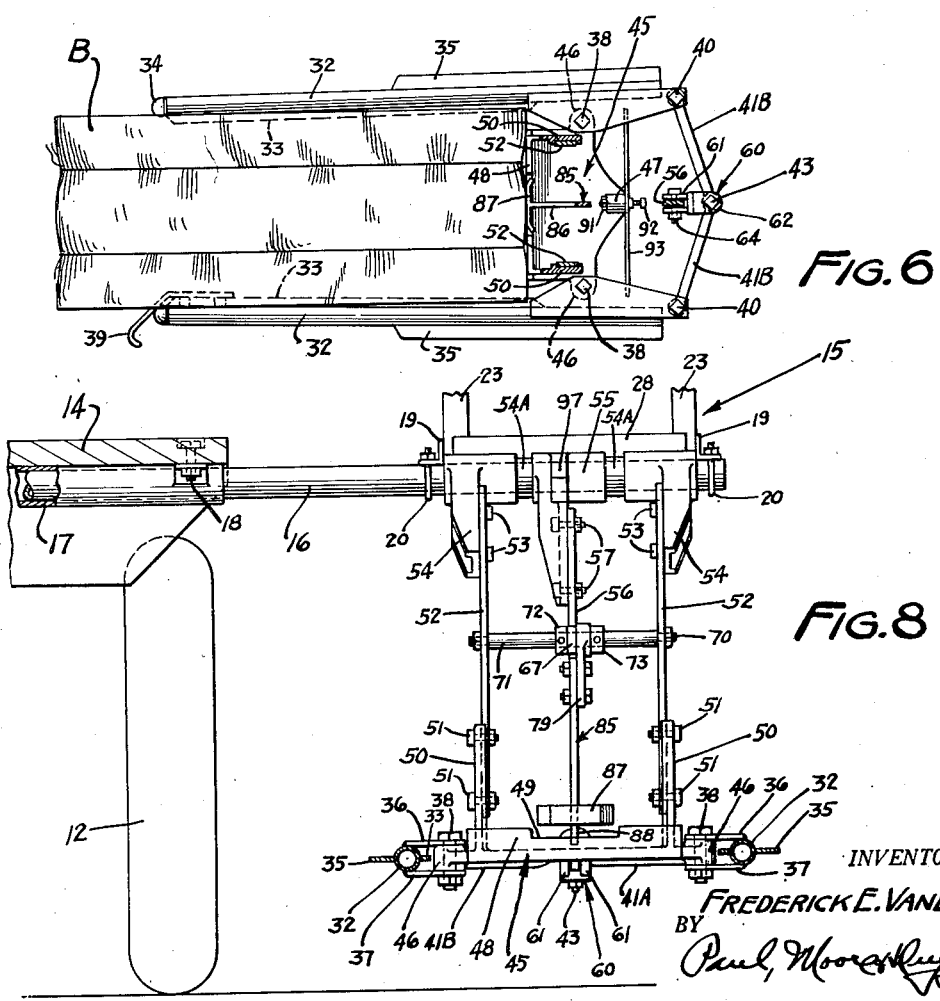

2,758,729

Patented Aug. 14, 1956

2,758,729

VEHICLE MOUNTED BALE LOADER

Frederick E. Van Dusen, Wayzata, Minn., assignor to Van Dale Farm Machines, Inc., Long Lake, Wayzata, Minn., a corporation of Minnesota Application October 5, 1953, Serial No. 384,129

13 Claims. (Cl. 214—77)

This invention relates to new and useful improvements in bale loaders and more specifically to new and useful improvements in bale loaders of the type adapted to engage a bale lying on the surface of the ground and elevating the bale to a travelling platform.

In the usual farming operation, the production of hay is an important and quite arduous procedure. Bales of hay ordinarily weigh eighty pounds per bale and many bales must be created, stacked, transported and disposed of for the larger farm. In practice, the hay is cut and baled and the bales of hay are left scattered in the field by the balers. Subsequently, the bales are picked up from the field and loaded into a wagon. This operation has usually required three or more men to load the wagon; one to drive the tractor which draws the wagon, another to stand on the wagon and load the bales, and at least one to walk along the ground and lift the bales to the wagon.

The present invention is adapted to be positioned upon a wagon and to be operated by hydraulic means from the drawing tractor, and to eliminate the necessity for having a man picking up the bales from the ground.

It is therefore an object of this invention to provide a bale loader carried by a vehicle which is operated by hydraulic means from the tractor drawing such vehicle.

It is also an object of this invention to provide a new and useful bale loader adapted to engage square, round, or skewed bales and elevate them for positioning on a wagon bed.

It is a further object of this invention to provide new and useful improvements in a bale loader adapted for operating on the side of hills or on rough ground.

It is a further object of this invention to provide new and useful improvements in a bale loader which may be attached to or readily removed from a vehicle.

Another object of this invention resides in new and useful improvements in a hydraulic lift bale loader having a single cylinder and bale engaging means for conditioning the mechanism operated by said cylinder.

It is still a further object of this invention to provide a bale loader having bale grabbing means and bale elevating means, both said means being operated by a single cylinder, said bale grabbing means being conditioned for operation by engagement of the loader with the bale.

It is a further object of this invention to provide a bale loader which will grab a bale positioned upon the surface of the ground, elevate the same and automatically release the bale for disposition upon a wagon bed.

Still another object of the present invention is to provide a hydraulically operated mechanical means adapted to lift heavy bales and deposit same on a cooperating platform.

Other and further objects of the invention reside in the improved constructional features of my bale loader including the provision of a single hydraulic cylinder for operating a pair of grab arms and for then elevating said grab arms and said bale, in the conditioning means engaged by one end of the bale for controlling the operation of the grab arms, in the specific constructional details of overcenter means and the stop means for automatically releasing the bale and in the constructional details of the platform and the supporting means.

This invention will be described with reference to the drawings forming a part of this specification in which corresponding numerals refer to the same parts and in which:

Figure 1 is a side elevational view of my invention positioned upon a flat bed wagon trailer;

Figure 2 is a horizontal sectional view taken along the line and in the direction of the arrows 2—2 of Figure 1 and showing the grab arms in the open position of Figure 1;

Figure 6 is a horizontal sectional view taken along the line and in the direction of the arrows 6—6 of Figure 5;

Figure 8 is a vertical sectional view taken along the line and in the direction of the arrows 8—8 of Figure 1; and Figure 9 is a horizontal sectional view taken along the line and in the direction of the arrows 9—9 of Figure 1 and showing the over-center toggle means for controlling the grab arms of my invention.

Figure 3:
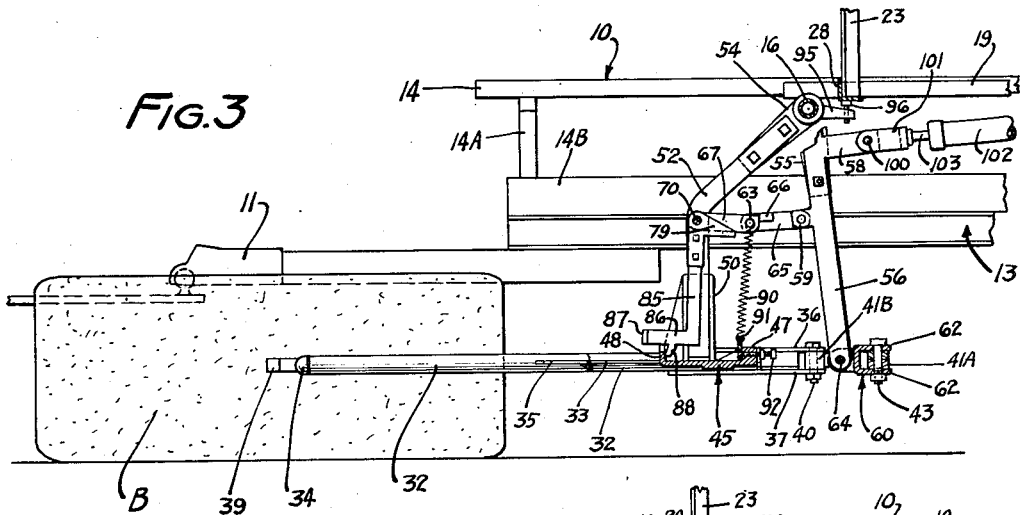
Figure 3 is a fragmentary elevation of the bale loader, in the position of Figure 1 but broken away to show the operating mechanism.

Referring now to the drawings and particularly to Figure 1, there is shown a flat-bed wagon trailer generally designated 10 having a towbar 11 connecting it to a tractor or other power propelled vehicle, wheels 12, supporting frame 13 and a flatbed 14 positioned thereon. In the instant drawings, the loader is illustrated as being supported from a two wheeled flatbed trailer, but it is to be understood that this invention contemplates that it may be used with other supporting vehicles such as the conventional four wheeled flatbed farm wagon.

Trailer 10 in this instance is provided with bolsters 14A secured to stringers 14B, one of which is shown in Figure 1, which are in turn supported by frame 13.

My invention comprises a loader generally designated 15 supported on a pair of support pipes or rods 16 which are in turn secured within a pair of sleeve mounting pipes 17, one of which is shown in Figure 8, and the other of which is identical thereto, supoprted from the flatbed 14 by a plurality of bolts 18 attached to flanges on mounting pipes 17, one of which bolts is also shown in Figure 8.

The unloader 15 is provided with a pair of angle iron frame members 19 secured by U-bolts 20 to the extending ends of support pipes 16. Frame members 19, as is shown best in Figure 1, extend slightly beyond the two pipes 16 and the U-bolts 20 are affixed to the horizontal flanges thereof. Welded or otherwise secured to each of the vertical angles 19 is a pair of uprights 23. Uprights 23 are welded to the vertical flange of frame member 19 and are provided at their top end with platform angles 24 upon which is positioned a platform or tier 25. Thus, with reference to Figure 1, it will be seen that platform 25 comprises a second tier upon which the bales are adapted to be discharged when it is considered that the flatbed 14 of the wagon comprises the first tier. An L-shaped guard rail 26 is secured to tier 25 by flanges 27, which are bolted to the tier 25.

Extending between the bottoms of the forward members of each pair of uprights 23 (shown in Figures 1 and 7) is a stop bar 28 which will be utilized as will be more fully explained.

The bale loader is provided with a pair of forwardly extending grab arms 32 normally extended as shown in Figure 2. The arms in this instance are of cylindrical cross-section but are provided with horizontal grab flanges 33, rounded end plugs 34 and strengthening webs 35. Secured to the rear ends of each of grab arms 32 are top and bottom triangular plates 36 and 37, respectively. Plates 36 and 37 are each provided with apertures through which is passed a pivot pin 38, and around which the plates and consequently the grab arms 32 pivot.

A grab arm extension 39 is provided for the outer grab arm 32 if desired and functions to guide skewed bales into position between the two grab arms.

Each of the plates 36 and 37 are likewise apertured at the extending end thereof for the passage therethrough of pivot pin 40. Positioned between plates 36 and 37 is a toggle link. Thus, two toggle links 41A and 41B are provided, one for each of the grab arms 32 and are pivotally connected at their center by pin 43.

Referring specifically to Figure 1, it will be seen that the toggle members 41A and 41B are oppositely off-set adjacent pivot 43 so that their cooperating ends provide an off-set connection 44 to pin 43.

Grab arms 32 are pivoted by pins 38 to a bumper casting 45 which has a plan configuration somewhat in the shape of a crown. Casting 45 is provided with bosses 46 through which pivots 38 are passed and with a single boss 47 at the peak portion of the crown configuration. Casting 45 is also provided with a forward upturned web 48 having a central recess 49 therein. The plate 45 is provided with a pair of integral uprights 50 which are of channel configuration as shown best in Figures 2 and 6. Uprights 50 are secured by bolts 51 to a pair of lift arms 52 which have their ends positioned in the channels of uprights 50. Arms 52 are of angular elevation as is seen best with reference to Figure 1.

Arms 52 are secured at their upper ends by bolts 53 to a pair of lift arm brackets 54 which are sleeved onto forward pipe 16 and separated from a lift lever bracket 55 by spacers 54A.

Situated between brackets 54 is the left lever bracket 55 to which is attached lift lever 56 by bolts 57. Lever 56 has a rearward extension 58 and a forward extension 59 and is pivotally secured at its lower end by pivot pin 64 which traverses forward bifurcations 61 of a member 60, through the rearward bifurcations 62 of which is passed pivot pin 43.

Pivotally secured to forward extension 59 is a toggle link 65 having a stop 66 and which is also pivotally connected to a toggle link 67 which in turn is pivotally connected to a pivot 70 positioned at the center of lift arms 52. Pivot 70 is provided with an enlarged center portion 71 on which a retaining collar 72 is positioned adjacent toggle link 67 as shown best in Figures 8 and 9, and on which retaining collar 73 is positioned adjacent toggle release member 79 as shown also in Figure 8. Member 79 comprises a rocker arm having a rearward extension with a horizontal portion 80 adapted to underlie toggle link 67 and with a forwardly extending arm secured to a grab arm conditioning means comprising a bumper 85. Bumper 85 is provided with forward extension 86 to which is attached a transverse member 87 adapted to engage a bale. A depending foot 88 engages web 48 and prevents the member 85 from pivoting in a clockwise direction beyond the position of Figure 3.

A spring 90 has one end secured to a rectangular nut 91 positioned in abutment with boss 47 by cap screw 92. Cap screw 92 also serves to secure to boss 47 an evener 93 which extends between plates 36 and 37 as shown in Figure 2. The other end of spring 90 is connected to the pivot 63 of toggle links 65 and 76.

One of brackets 54 is provided with a tail stop 95 having an adjustable cap screw 96 therein adapted to engage the underside of the horizontal flange of stop-bar 28 as illustrated in Figure 3.

Figure 7:
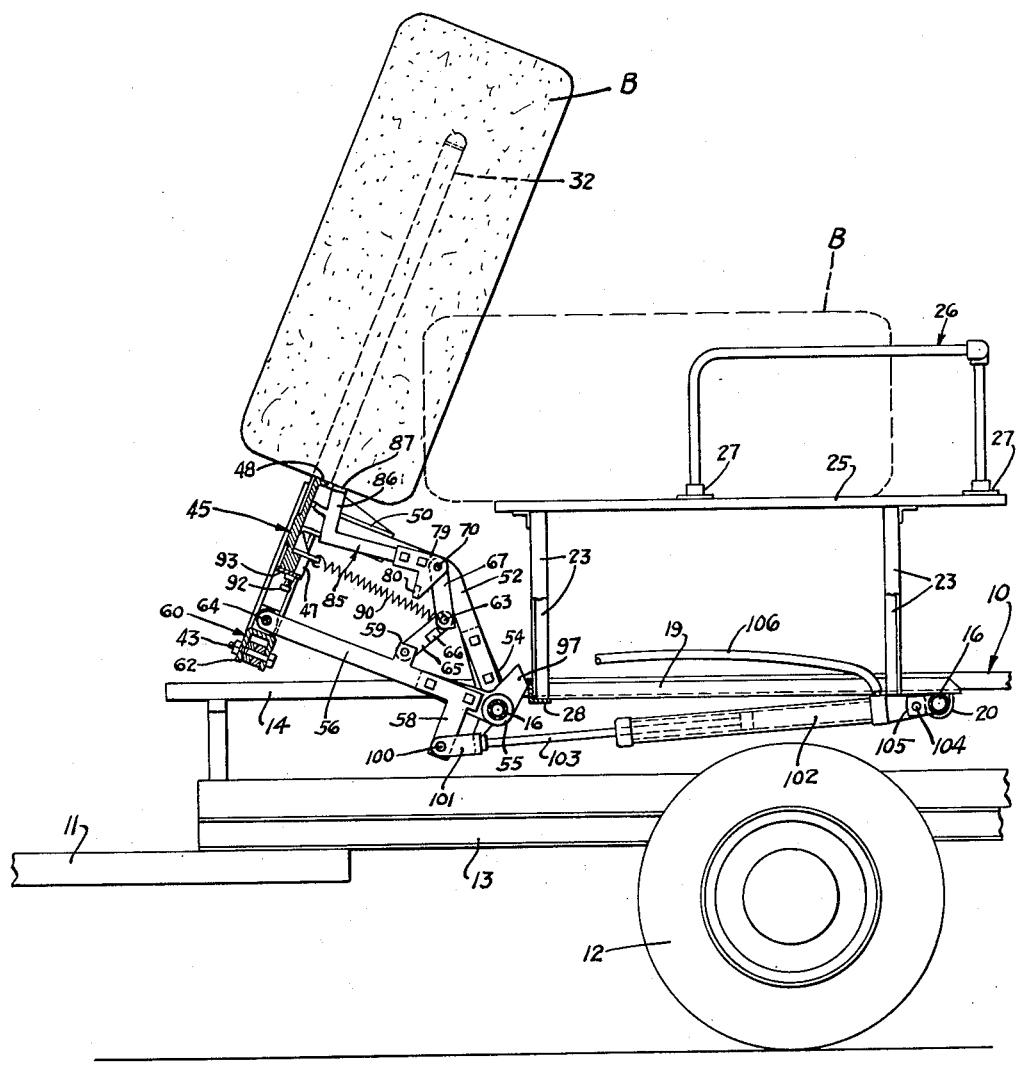
Figure 7 is a side elevational view, similar to Figure 1, but showing the bale in elevated position.

Central bracket 55 has a forwardly extending stop 97 adapted to engage the vertical flange of stop-bar 28 when the bale loader is arcuately pivoted to the position of Figure 7.

Extension 58 as shown in Figure 1 is pivoted at 100 to the clevice 101 of the hydraulic cylinder 102. Clevice 101 is connected to the piston rod 103 of the cylinder 102 for operation therewith. The other end of cylinder 102 is pivotally connected by pin 104 to a bracket 105 connected to rear pipe 16. A fluid line 106 leads from the cylinder 102 to a source of hydraulic fluid under pressure, usually obtained from the tractor driving the trailer 10.

The bale loader is shown in inoperative, or in position preliminary to bale engagement, in Figures 1 and 2. In this position the toggle links 65 and 67 are maintained in downward over-center position by the action of the spring 90, but are limited from further over-center movement by stop 66 which abuts the square end of link 67. Link 67 is retained in a limit position by the horizontal flange 80 of the toggle release member 79. Bumper 85 is maintained in the position of Figures 1 and 3 by the action of links 67 against horizontal portion 80. It is prevented from further clockwise movement relative to web 48 by depending foot 88. The stop 95 is in engagement with stopbar 28 and serves to provide a rearward limit position for the mechanism and to prevent the grab arms 32 from dropping to the ground during the brief interval when the bale strikes the bumper 85 and thus breaks the toggle 65—67, but before the bale is raised by hydraulic pressure in cylinder 102.

As the vehicle 10 is propelled along the ground, it is guided so that a bale B will enter the space provided between the grab arms 32 as illustrated in Figures 1–3. Subsequent travel of the vehicle and consequently of the loader in the direction of arrow 106 (Figure 2) will cause the bale B to engage the bumper 85, pivoting member 79 to the position of Figure 4, and thus by means of the horizontal portion 80 breaking the toggle 65—67 and placing tension upon spring 90.

The evener 93 extends between plates 36 and 37, and serves to prevent sidewise oscillations of the grab arms 32 when the arms are in the position of Figures 1–3. This evener keeps the arms in position and will not allow the arms 32 to be swung as a unit if one arm 32 should be contacted by a bale before the other arm. In other words, referring specifically to Figure 2, if the bale B should strike the lowermost of arms 32, there would be a tendency to pivot this arm counterclockwise. If the evener 93 were not provided, the rear end of the lower arm 32 would likewise be pivoted in a counterclockwise direction, thus the whole lower arm 32 would push away when the bale hits. With the evener present, the bale will remain in the position of Figures 1–3 and the bale will be guided directly into the bumper 85. The evener further insures that the two grab arms will operate to grasp a bale substantially longitudinally with respect to the flatbed trailer.

Figure 4:
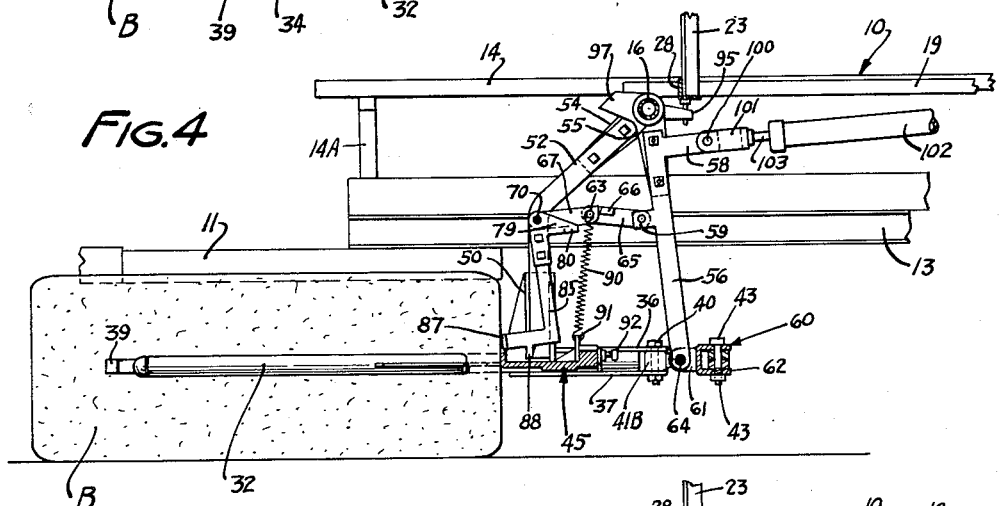
Figure 4 is a view similar to Figure 3 but showing a bale in initial contact with the grab arm conditioning means of my invention.
Figure 5:
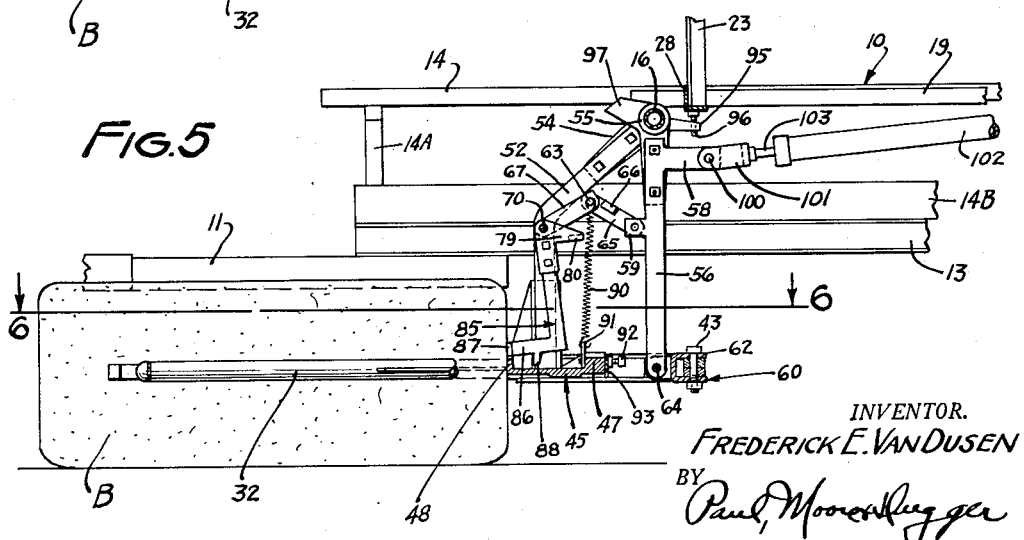
Figure 5 is a view similar to Figures 3 and 4, but showing the mechanism after the conditioning means have been fully engaged and the grab arms have moved into position to contact the sides of the bale.

As the bale B is guided in to strike the bumper 85 and the mechanism has moved to the position of Figure 4, pressure is then admitted via line 106 to cylinder 102 by the operator. This commences to extend piston rod 103 as shown in Figure 5 so that the arms 32 move to the position of Figure 6. This is accomplished by means of lever 56 operating the toggle formed by links 41A and 41B, and thus pivoting the grab arms from the position of Figure 2 to that of Figure 6 until they engage the bale as shown in Figure 6. When the arms 32 have engaged the bale as shown in Figure 6, the links 41A and 41B will cease to pivot outwardly with respect to pivot 43 and the rod 103 will then move the entire loader in a vertical direction about the axis of pipe 16 to the position of Figure 7.

The movement of rod 103 swings the loader 15 rather rapidly from the position of Figure 5 to that of Figure 7, and consequently the loader is rather abruptly brought to a halt in the position of Figure 7 by engagement of the stop 97 with the vertical flange of stopbar 28. The momentum of the loader 15 will be such that the lift arms 52 will continue to pivot in a clockwise direction thus separating arms 52 from lever 56 to an extent that spring 90 will become operative and reposition the toggle 65—67 to the position of Figures 1–3 and the bumper 85 to that position. As the momentum carries arms 52 further in a clockwise direction past the position of Figure 7, they will automatically spread to an open position by reason of the separation of pivots 38 from pivots 43. Thus, the bale will be automatically dumped to the dotted line position of Figure 7. Thereupon, the operator will release the pressure in line 106 and gravity will return the unloader 15 to the position of Figures 1–3.

As many apparently widely differing embodiments of this invention may be made without departing from the spirit and scope thereof, it is to be understood that I do not limit myself to the specific embodiments disclosed herein.

What I claim is:

1. A bale loader comprising in combination, a supporting frame adapted to be secured to a vehicle, depending means pivotally secured to said frame for pivotal movement about a substantially horizontal axis, a pair of spaced extending members each pivoted to said depending means for movement about substantially vertical axes and in spaced relation, each of said extending members being pivoted intermediate its ends to provide spaced front and rear ends, extendable link means connecting the rear ends of said extending members for moving them simultaneously about their respective pivot axes, an extensible actuator pivotally connected to said extendable link means at one end and pivotally connected to said frame at the other end, whereby when said last member is extended it will extend said link means for separating the rear ends of said extending members and move the front ends of said extending members into engagement with a bale and then pivot said depending means about its horizontal pivot.

2. The apparatus of claim 1 further characterized in that said extendable means comprises a single hydraulic cylinder and piston.

3. The apparatus of claim 1 further characterized in that said means connecting said spaced rear ends comprises a pair of toggle links.

4. A bale loader comprising in combination a supporting frame adapted to be secured to a vehicle, depending means pivotally secured to said frame for movement about a substantially horizontal axis, bale engaging means secured to said depending means, said bale engaging means comprising a pair of extending members pivoted to said depending means for movement about substantially vertical axes and extending forwardly therefrom in spaced relation, said members having spaced front and rear ends, extendable means connecting said spaced rear ends for the separation thereof, an extensible actuator means connected to said frame and to said extendable means for the separation of said rear ends and for causing said bale engaging means to grasp a bale and for then moving said depending means about said horizontal pivot, and means normally locking said extending members in spaced relation and adapted to be engaged by the end of a bale for release thereof.

5. A bale loader comprising in combination a frame, means depending from said frame supporting a pair of spaced bale engaging members, said bale engaging members being pivoted to said means intermediate their front and rear ends and for movement about substantially vertical axes, means connecting the rear ends of said bale engaging members, said means being movable from a first position in which the front and rear ends of said bale engaging members are normally spaced to a second position in which the space between said front ends is diminished and that between the rear ends enlarged, second means depending from said frame and connected to said means connecting the rear ends of said bale engaging members, said first and second depending means being pivoted to said frame for movement about substantially horizontal axes, said first and second depending means being positioned in normally spaced substantially parallel relationship, and means connected to said second depending means for moving it toward said first depending means whereby said means connecting the rear ends is moved from first to second position and locking means normally retaining said bale engaging members in first position and means engageable by a bale for releasing the same.

6. A bale loading device adapted to be carried and moved by a vehicle comprising in combination a frame secured to said vehicle, bale engaging members extending from said frame in normally spaced relation and swingable through substantially horizontal direction, said members being arranged so as to move into position to grasp a bale, means adapted to be engaged by an end of said bale and actuated thereby, means for moving said bale engaging members together to engage said bale, toggle means controlled by said means adapted to be engaged by the end of said bale for controlling said means for moving said bale engaging members together, said toggle means being actuable from a first to a second position, said toggle means when in said first position preventing said bale engaging members from moving to bale engaging position and said toggle means when in said second position allowing said bale engaging members to be moved to bale engaging position and said means adapted to be engaged by the end of said bale moving said toggle means from first to second position.

7. A bale loader comprising in combination a frame, first means pivotally secured to the frame for movement about a substantially horizontal axis and depending therefrom, second means pivotally secured to the frame for movement about a substantially horizontal axis and depending therefrom, the second means being positioned in normally spaced substantially parallel relationship to the first means, a pair of normally spaced extending grab arms pivoted intermediate their ends to the first means for movement about substantially vertical axes, said grab arms having front ends and rear ends, adjustable means connecting the rear ends of said grab arms, said adjustable means being movable towards a line passed through said rear ends for separating the same and for causing the front ends of said grab arms to move towards one another, said second means being connected to said adjustable means, and extendable means connected to the frame and to the second means, connecting means connecting said first and second depending means and normally maintaining the same in spaced relation, and a conditioning means for moving said connecting means whereby said first and second depending means may be moved relatively together.

8. A bale loader comprising in combination a frame, first means pivotally secured to the frame for movement about a substantially horizontal axis and depending therefrom, second means pivotally secured to the frame for movement about a substantially horizontal axis and depending therefrom, the second means being positioned in normally spaced substantially parallel relationship to the first means, a pair of normally spaced extending grab arms pivoted intermediate their ends to the first means for movement about substantially vertical axes, said grab arms having front ends and rear ends, means connecting the rear ends of said grab arms, said means being movable from a first position in which the front and rear ends of said grab arms are normally spaced to a second position in which the space between said front ends is diminished and that between the rear ends enlarged, said second means being connected to said last means, extendable means connected to the frame and to the second means, and a limit stop on said second depending means for determining the elevated limit position of said means and said first depending means being adapted for elevation beyond such limit position.

9. A bale loader comprising in combination a frame, first means pivotally secured to the frame for movement about a substantially horizontal axis and depending therefrom, second means pivotally secured to the frame for movement about a substantially horizontal axis and depending therefrom, the second means being positioned in normally spaced substantially parallel relationship to the first means, a pair of normally spaced extending grab arms pivoted intermediate their ends to the first means for movement about substantially vertical axes, said grab arms having front ends and rear ends, means connecting the rear ends of said grab arms, said means being movable from a first position in which the front and rear ends of said grab arms are normally spaced to a second position in which the space between said front ends is diminished and that between the rear ends enlarged, said second means being connected to said last means, extendable means connected to the frame and to the second means, a limit stop on said second depending means for determining the elevated limit position of said means and said first depending means being adapted for elevation beyond such limit position, and a limit stop on said first depending means for determining the limit position of said depending means in normal position.

10. A bale loader comprising in combination a supporting frame adapted to be secured to a vehicle comprising a first depending means pivotally connected to said frame for pivotal movement from a first normal to second elevated position, a pair of spaced forwardly extending grab arms connected intermediate their ends to said first depending means, means joining the rearward ends of said grab arms together, a second depending means pivotally connected to said frame for rotation from a first normal to second elevated position about a horizontal axis, and connected to the means joining the rearward ends of said grab arms together, means connected to said frame and to said second depending means, linkage means connecting said first and second depending means movable from a first to second position, said linkage means maintaining said first and second depending means in spaced relation when in first position and permitting movement of said second depending means toward said first depending means when in second position, means adapted to be engaged by a bale for moving said linkage means from first to second position and means connected to said frame and to said second depending means for moving it about said horizontal axis to said elevated position.

11. The apparatus of claim 10 further characterized by means preventing movement of the front ends of said grab arms beyond normal spaced relation.

12. A bale loader adapted to be carried on one side of a vehicle comprising in combination a supporting frame having uprights and a platform thereon, a pair of spaced supporting pipes secured to said frame, spaced sleeve means positioned on said vehicle and adapted to receive said spaced supporting pipes for positioning said frame relative to a vehicle, a pair of depending arms pivotally connected to one of said supporting pipes and in spaced relation and pivotal from a normal to elevated position, a substantially planar member secured to the depending ends of said arms, a pair of spaced parallel and forwardly diverging extending grab arms connected intermediate their ends to said planar member, a toggle joining the rearward ends of said grab arms together, a third depending arm pivotally connected for rotation about said one of said horizontal pipes, and connected to the pivotal connection of said toggle joining the rearward ends of said grab arms, a toggle linkage connecting said first and second depending members and spring biased means normally positioning said toggle linkage in over-center limit position, an arcuately movable member positioned for pivotal movement about a horizontal axis on said first depending members, having a surface adapted to be engaged by a bale, and a means preventing arcuate movement of said member in bale-engaging direction, a horizontal portion of said member adapted to underlie one of the links of said toggle means connecting said first and second arms and said spring normally biasing said link against said member, a forwardly positioned stop means connected to said third depending arm and adapted to abut a portion of the frame when said first and second depending arms have been pivoted about said pipe so that said grab arms are in elevated position, a stop means secured to one of said first depending members and adapted to engage a portion of said frame when said first members are in normal position, and a hydraulic cylinder connected to said frame and to said third depending arm.

13. A bale loader comprising in combination a supporting frame adapted to be secured to a vehicle comprising a depending means pivotally connected to said frame for pivotal movement from a first normal to second elevated position, a pair of spaced forwardly extending grab arms connected intermediate their ends to said first depending means, and having normally spaced front and rear ends, expansible and contractable means joining the rear ends of said grab arms together whereby the spacing between said rear ends may be increased or decreased, a hydraulic cylinder having a piston rod connected to said expansible and contractable means and to said frame and operable to increase the spacing between said rear ends as said rod extends, whereby as said rod extends it will first separate said rear ends, and when the separation of said rear ends is impeded by the engagement of the front ends with a bale, will pivot said depending means from said first to second position, a stop means connected to said depending means and adapted to abut a portion of the frame when said depending means has been pivoted to second position but before said piston rod has reached full extension whereby the front ends of said grab arms will automatically spread to release the bale.

References Cited in the file of this patent

UNITED STATES PATENTS

| 344,222 | Thomas | June 22, 1886 |
| 2,225,787 | McDermott et al. | Dec. 24, 1940 |
| 2,531,070 | McDermott | Nov. 21, 1950 |
| 2,620,935 | Christiansen | Dec. 9, 1952 |
| 2,634,003 | Williamson et al. | Apr. 7, 1953 |
| 2,646,181 | Maxwell | July 21, 1953 |
| 2,656,058 | Foote | Oct. 20, 1953 |
| 2,693,285 | Buschbom | Nov. 2, 1954 |
| 2,704,164 | David | Mar. 15, 1955 |

FOREIGN PATENTS

| 671,332 | Great Britain | Apr. 30, 1952 |